US010295150B2

(12) United States Patent
Smith

(10) Patent No.: US 10,295,150 B2

(45) **Date of Patent: *May 21, 2019**

(54) ASYMMETRICAL OPTICAL SYSTEM

(71) Applicant: Whelen Engineering Company, Inc., Chester, CT (US)

(72) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/262,670

(22) Filed: Sep. 12, 2016

(65) Prior Publication Data

US 2016/0377259 A1 Dec. 29, 2016

Related U.S. Application Data

(63) Continuation of application No. 13/872,263, filed on Apr. 29, 2013, now Pat. No. 9,441,808, which is a (Continued)

(51) Int. Cl.

*F21V 29/502* (2015.01)
*F21V 5/08* (2006.01)

(Continued)

(52) U.S. Cl.

CPC ................. *F21V 5/08* (2013.01); *F21S 4/28* (2016.01); *F21V 5/04* (2013.01); *F21V 7/00* (2013.01); *F21V 7/005* (2013.01); *F21V 7/0025* (2013.01); *F21V 7/04* (2013.01); *F21V 7/06* (2013.01); *F21V 7/09* (2013.01); *F21V 13/04* (2013.01); *F21V 29/004* (2013.01); *F21V 29/507* (2015.01); *F21V 29/74* (2015.01); *F21V 29/89* (2015.01); *B60Q 1/24* (2013.01); *F21V 29/503* (2015.01); *F21V 29/763* (2015.01); *F21V 29/767* (2015.01); *F21W 2131/1005* (2013.01); *F21Y 2101/00* (2013.01);

(Continued)

(58) Field of Classification Search

CPC ............ F21V 5/08; F21V 5/04; F21V 7/0025

See application file for complete search history.

(56) References Cited

U.S. PATENT DOCUMENTS

| | | | |
|---|---|---|---|
| 1,235,275 | A | 7/1917 | Wood |
| 6,471,375 | B2 | 10/2002 | Kobayashi et al. |

(Continued)

FOREIGN PATENT DOCUMENTS

| | | | |
|---|---|---|---|
| WO | 2006020687 | A1 | 2/2006 |

*Primary Examiner* — Sharon E Payne

(74) *Attorney, Agent, or Firm* — Alix, Yale & Ristas, LLP

(57) ABSTRACT

An asymmetrical optical assembly employs reflecting surfaces and a lens to combine the light from a plurality of LED lamps into an illumination pattern useful in a floodlight or work light. The reflecting surfaces and lens optical element are not symmetrical with respect to a plane bisecting the optical assembly and including the optical axes of the LED light sources. Some light from the LED light sources is redirected from its emitted trajectory into the desired illumination pattern, while a significant portion of the light from the LED light sources is permitted to exit the optical assembly without redirection. Minimizing the number of optical elements employed and the redirection of light enhances the efficiency of the resulting light assembly.

18 Claims, 8 Drawing Sheets

Related U.S. Application Data continuation of application No. 12/638,521, filed on Dec. 15, 2009, now Pat. No. 8,430,523.

(51) Int. Cl.

| | |
|---|---|
| ***F21V 7/00*** | (2006.01) |
| ***F21V 29/00*** | (2015.01) |
| ***F21V 7/04*** | (2006.01) |
| ***F21V 7/09*** | (2006.01) |
| ***F21V 13/04*** | (2006.01) |
| ***F21V 29/507*** | (2015.01) |
| ***F21V 29/74*** | (2015.01) |
| ***F21V 29/89*** | (2015.01) |
| ***F21S 4/28*** | (2016.01) |
| ***F21V 5/04*** | (2006.01) |
| ***F21V 7/06*** | (2006.01) |
| *F21W 131/10* | (2006.01) |
| *F21Y 101/00* | (2016.01) |
| *F21Y 103/10* | (2016.01) |
| *F21Y 115/10* | (2016.01) |
| *F21V 29/503* | (2015.01) |
| *F21V 29/76* | (2015.01) |
| *F21Y 105/10* | (2016.01) |
| *B60Q 1/24* | (2006.01) |

(52) U.S. Cl.

CPC ....... *F21Y 2103/10* (2016.08); *F21Y 2105/10* (2016.08); *F21Y 2115/10* (2016.08)

(56) References Cited

U.S. PATENT DOCUMENTS

| | | | | |
|---|---|---|---|---|
| 6,641,284 | B2 | 11/2003 | Stopa et al. | |
| 6,644,841 | B2 | 11/2003 | Martineau | |
| 6,739,738 | B1 | 5/2004 | Smith | |
| 6,758,582 | B1 | 7/2004 | Hsiao et al. | |
| 6,851,835 | B2 | 2/2005 | Smith et al. | |
| 7,008,079 | B2 | 3/2006 | Smith | |
| 7,083,313 | B2 | 8/2006 | Smith | |
| 7,175,303 | B2 | 2/2007 | Kovacik et al. | |
| 7,461,944 | B2 | 12/2008 | Alessio | |
| 7,520,650 | B2 | 4/2009 | Smith | |
| 7,690,826 | B2 | 4/2010 | Kim | |
| 8,430,523 | B1 * | 4/2013 | Smith | F21V 29/004<br>362/235 |
| 9,388,961 | B2 * | 7/2016 | Smith | F21V 13/04 |
| 9,441,808 | B2 * | 9/2016 | Smith | F21V 29/004 |
| 2001/0022725 | A1 | 9/2001 | Kobayashi et al. | |
| 2007/0242461 | A1 | 10/2007 | Reisenauer et al. | |
| 2008/0165535 | A1 | 7/2008 | Mazzochette | |

* cited by examiner

ASYMMETRICAL OPTICAL SYSTEM

BACKGROUND

The present disclosure relates to optical systems for use in conjunction with flood and area lights for work site illumination and emergency vehicles.

Halogen, metal halide, mercury vapor, sodium vapor, arc lamps and other light sources have been employed in floodlights. Floodlights typically employ a weather-resistant, hermetic housing surrounding the light source. The light source is typically positioned in front of a reflector and behind a lens, each of which are configured to redirect light from the light source into a large area diverging beam of light. Traditional floodlights are typically mounted so that the direction of the light beam can be adjusted with respect to the horizontal, allowing the floodlight to illuminate areas above or below the height of the light. The floodlight support may also permit rotation of the light.

When floodlights are employed in conjunction with emergency response vehicles such as fire trucks, ambulances or rescue vehicles, they may be mounted to a pole which allows the elevation and orientation of the floodlight to vary with respect to the vehicle. Alternatively, floodlights may be mounted to the top front corner of the cab (so called "brow lights"), or the floodlights are mounted in an enclosure secured to a vertical side or rear face of the vehicle body. It is frequently desirable for the floodlight to illuminate an area of the ground surrounding the vehicle. In such cases, floodlights are typically directed downward to produce the desired illumination pattern.

While prior art floodlights have been suitable for their intended purpose, prior art light sources suffer from excessive energy consumption and relatively short life spans. Light emitting diode (LED) light sources are now commercially available with sufficient intensity of white light to make them practical as an alternative light source for flood and area lighting. The semiconductor chip or die of an LED is typically packaged on a heat-conducting base which supports electrical connections to the die and incorporates some form of lens over the die to shape light emission from the LED. Such packages including a base with electrical connections and thermal pathway, die and optic are typically referred to as an LED lamp. Generally speaking, LED lamps emit light to one side of a plane including the light emitting die and are therefore considered "directional" light sources. The light emission pattern of an LED is typically measured and described with respect to an optical axis projecting from the die of the LED and perpendicular to the plane including the die. A hemispherical (lambertian) pattern of light emission can be described as having an angular distribution of two pi steradians.

Although the total optical energy emitted from an LED lamp continues to steadily improve, it is still typically necessary to combine several LED lamps to obtain the optical energy necessary for a given illumination pattern. Optical systems are employed to integrate the optical energy from several LED lamps into a coherent illumination pattern suitable for a particular task. Optical systems utilize optical elements to redirect light emitted from the several LED lamps. Optical elements include components capable of interacting with optical energy and can include devices such as, but not limited to, filters, reflectors, refractors, lenses, etc. Light being manipulated by optical elements typically experiences some form of loss from scatter, absorption, or reflection. Thus, for example, optical energy interacting with a lens will scatter a percentage of the optical energy at each lens surface with the remainder of the optical energy passing through the lens. A typical aluminized reflector is between 92 and 95% efficient in redirecting optical energy incident upon it, with the remainder being scattered or absorbed. Optical efficiency is the ratio of total optical energy that reaches the desired target area with respect to the total optical energy produced by the light source.

In a typical prior art optical system, the optical elements are arranged symmetrically with respect to an optical axis of the light source, such as a circular parabolic aluminized reflector (PAR), a circular Fresnel lens or the like. Other prior art optical systems may exhibit elongated symmetry with respect to a longitudinal axis and/or plane bisecting the light. Elongated symmetry is commonly associated with elongated lamp formats used in some quartz halogen, fluorescent or metal halide light sources.

SUMMARY

An objective of the disclosed asymmetrical optical system is to efficiently redirect light from the plurality of LEDs into a desired illumination pattern. The disclosed asymmetrical optical system employs optical elements only where necessary to redirect light from the LEDs into the desired illumination pattern. Where light from the LEDs is emitted in a direction compatible with the desired illumination pattern, the light is allowed to exit the asymmetrical optical system without redirection by an optical element.

DETAILED DESCRIPTION OF A PREFERRED EMBODIMENT

Figure 1:
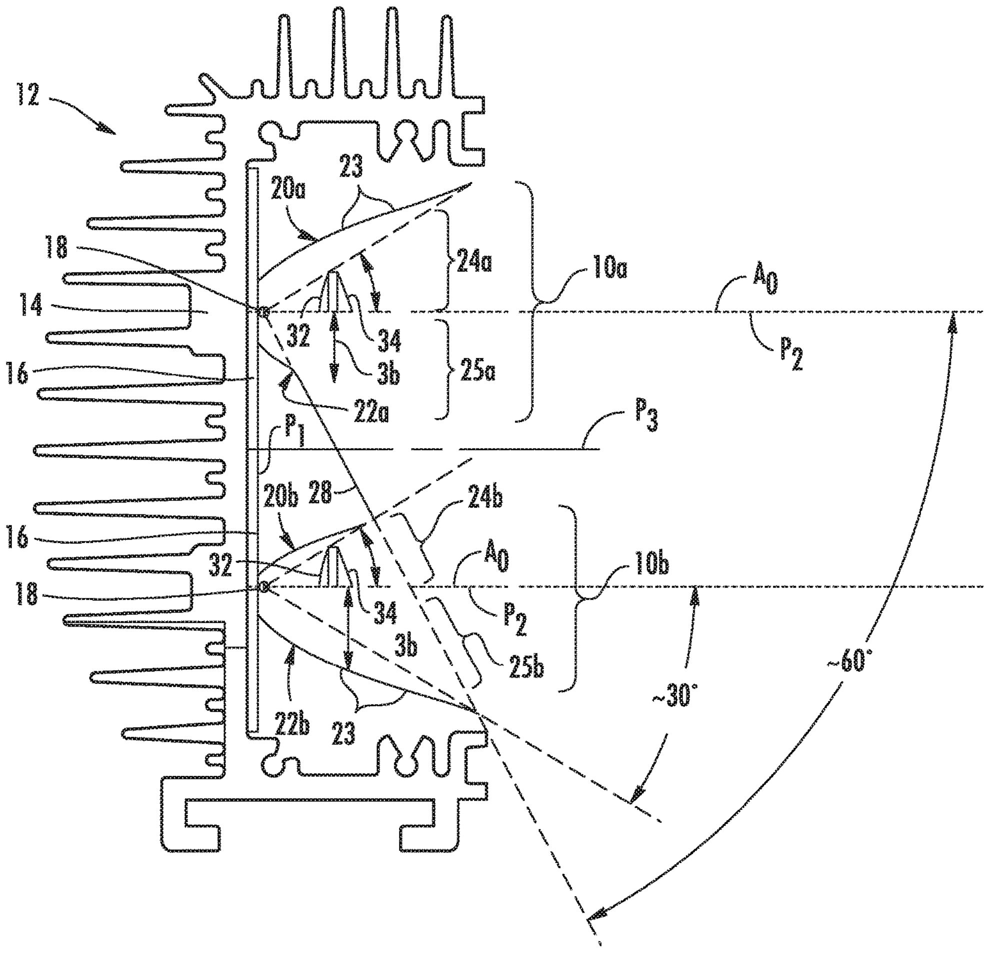
FIG. 1 is a sectional view through a floodlight employing two alternative embodiments of an asymmetrical optical system according to the present disclosure.

As shown in FIGS. 1-8, two disclosed embodiments of an asymmetrical optical system 10*a*, 10*b* are incorporated into a floodlight 12 intended for use in combination with emergency response vehicles or as a work area light, though the disclosed optical system is not limited to these uses. The disclosed asymmetrical optical systems 10*a*, 10*b* employ optical elements that are not symmetrical with respect to an optical axis $A_0$ of the LED lamps 18 or a longitudinal axis $A_L$ or plane $P_2$ bisecting each asymmetrical optical system 10*a*, 10*b*.

With reference to FIGS. 1-4, the disclosed floodlight 12 includes a heat sink 14 which also serves as the rear portion of the housing for the floodlight 12. The heat sink 14 may be extruded, molded or cast from heat conductive material, typically aluminum and provides support for PC boards 16. A die cast aluminum heat sink is compatible with the disclosed embodiments. The heat sink 14 includes a finned outside surface, which provides expanded surface area to for shedding heat by radiation and convection. PC boards 16 carrying a plurality of LED lamps 18 are secured in thermally conductive relation to the heat sink 14 to provide a short, robust thermal pathway to remove heat energy generated by the LED lamps 18. In the disclosed floodlight 12, the plurality of LED lamps 18 are arranged in linear rows (linear arrays 19 best seen in FIG. 7) with the light emitting dies of each LED lamp 18 in each row being aligned along a longitudinal axis $A_L$. This configuration places the optical axes $A_0$ of the plurality of LED lamps 18 in a plane $P_2$ perpendicular to a planar surface $P_1$ defined by the PC boards 16. In this configuration, light is emitted from the LED lamps 18 in overlapping hemispherical (lambertian) patterns directed away from the planar surface $P_1$ defined by the PC boards 16.

The disclosed floodlight 12 is of a rectangular configuration and employs two alternatively configured asymmetrical optical systems 10*a*, 10*b*. The two asymmetrical optical systems 10*a*, 10*b* in the disclosed floodlight 12 share several common optical elements and relationships, but also differ from each other in material respects. Each of the asymmetrical optical systems 10*a*, 10*b* includes a linear array 19 of LED lamps 18 arranged to emit light on a first side of a first plane $P_1$. A second plane $P_2$ includes the optical axes $A_0$ of the LED lamps 18 and is perpendicular to the first plane $P_1$. The second plane $P_2$ passes through a longitudinal axis $A_L$ connecting the light emitting dies of the LED lamps 18 and bisects each asymmetrical optical system 10*a*, 10*b* into upper 24*a*, 24*b* and lower portions 25*a*, 25*b*, respectively.

Each of the asymmetrical optical systems 10*a*, 10*b* include first and second reflecting surfaces 20*a*, 20*b*; 22*a*, 22*b* originating at the first plane $P_1$ and extending away from the first plane $P_1$ and diverging with respect to the second plane $P_2$. With respect to asymmetrical optical system 10*a* (shown at the top in FIGS. 1-8), the first and second reflecting surfaces 20*a*, 22*a* are asymmetrical with respect to each other, e.g., the reflecting surfaces are not mirror images of each other. The first and second reflecting surfaces 20*a*, 22*a* are separated by and spaced apart from the second plane $P_2$ to form a pair of longitudinally extending reflecting surfaces on either side of the longitudinal axis $A_L$ of the linear array 19 of LED lamps 18. In asymmetrical optical system 10*a*, the first reflecting surface 20*a* is arranged to redirect light emitted from the LED lamps 18 at relatively large angles with respect to the second plane $P_2$. In asymmetrical optical system 10*a*, the first reflecting surface 20*a* is arranged to redirect light emitted at angles greater than approximately 30° with respect to said second plane $P_2$ as best seen in FIG. 1. Light emitted from the LED lamps 18 having this trajectory may also be referred to as "wide-angle" light. In the disclosed asymmetrical optical systems 10*a*, 10*b*, the first and second reflecting surfaces 20*a*, 20*b*; 22*a*, 22*b* are generally parabolic and may be defined by a parabolic equation having a focus generally coincident with the longitudinal focal axis $A_L$ of the linear array 19 of LED lamps 18.

The parabola or parabolic curve is projected along the longitudinal axis $A_L$ passing through the LED dies to form a generally concave reflecting surface as best illustrated in FIGS. 1-6. The term "parabolic" as used in this disclosure means "resembling, relating to or generated or directed by, a parabola." Thus, parabolic is not intended to refer only to surfaces or curves strictly defined by a parabolic equation, but is also intended to encompass variations of curves or surfaces defined by a parabolic equation such as those described and claimed herein. A true parabolic trough would tend to collimate light emitted from the linear array 19 of LED lamps 18 with respect to the plane $P_2$ bisecting each asymmetrical optical system. The word "collimate" as used in this disclosure means "to redirect the light into a direction generally parallel with" a designated axis, plane or direction. Light may be considered collimated when its direction is within 5° of parallel with the designated axis, plane or direction and is not restricted to trajectories exactly parallel with the designated axis, plane or direction.

Figure 2:
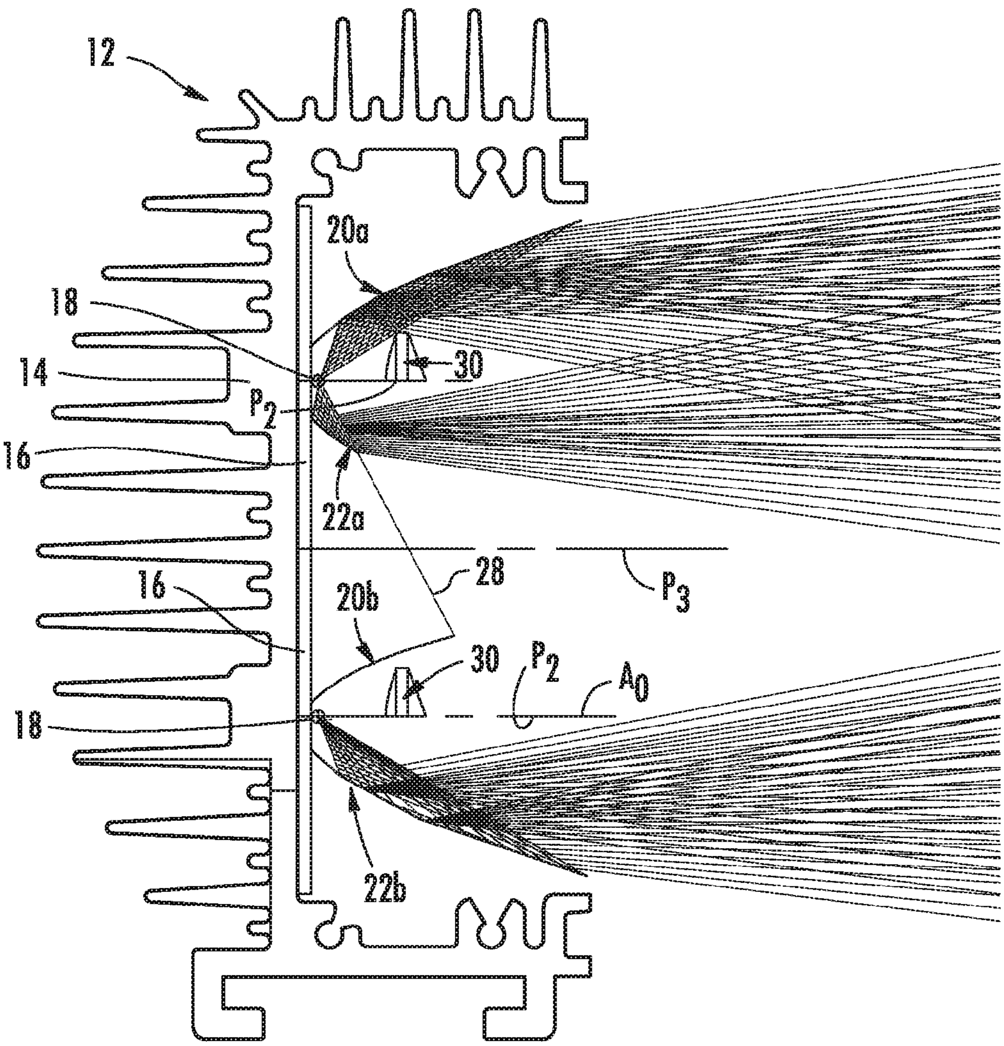
FIG. 2 is a sectional view through the floodlight of FIG. 1, showing redirection of light emanating from LED lamps by reflecting surfaces in each of the disclosed asymmetrical optical systems.
Figure 4:
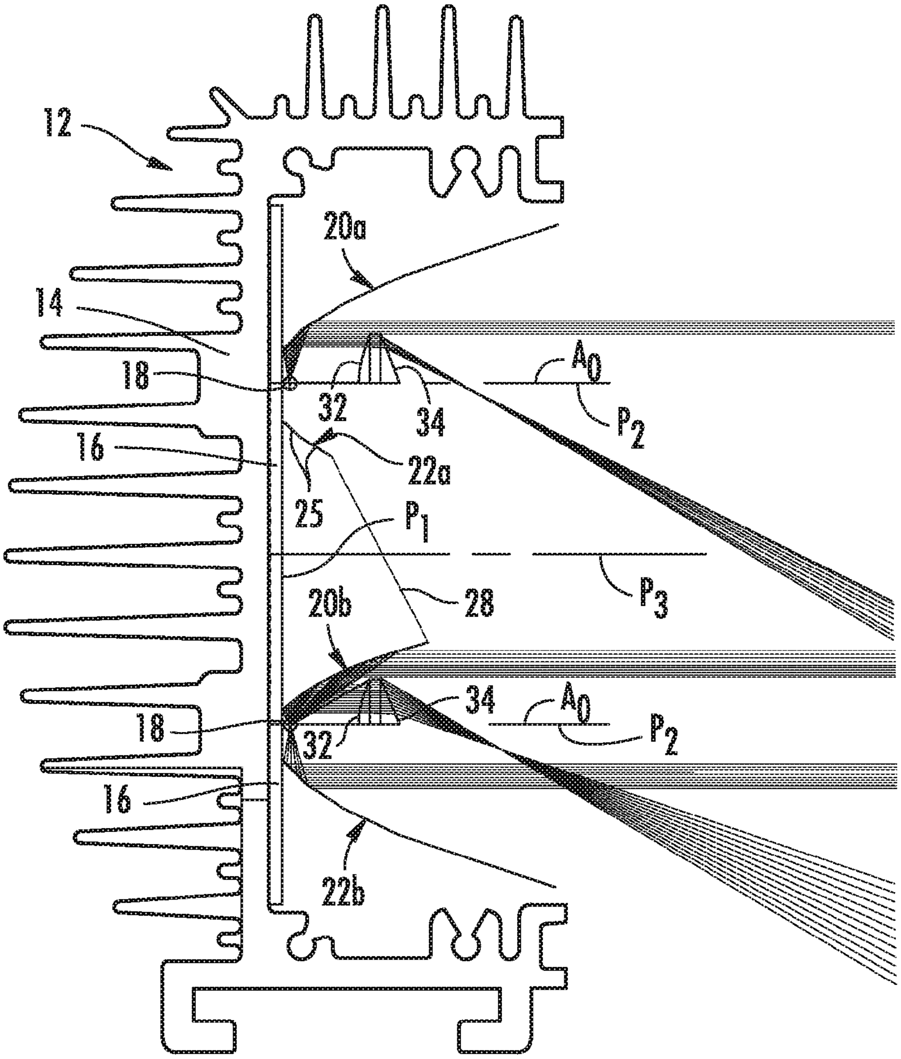
FIG. 4 is a sectional view through the floodlight of FIG. 1 showing redirection of light emanating from LED lamps by reflecting surfaces and lenses in each of the disclosed asymmetrical optical systems.
Figure 5:
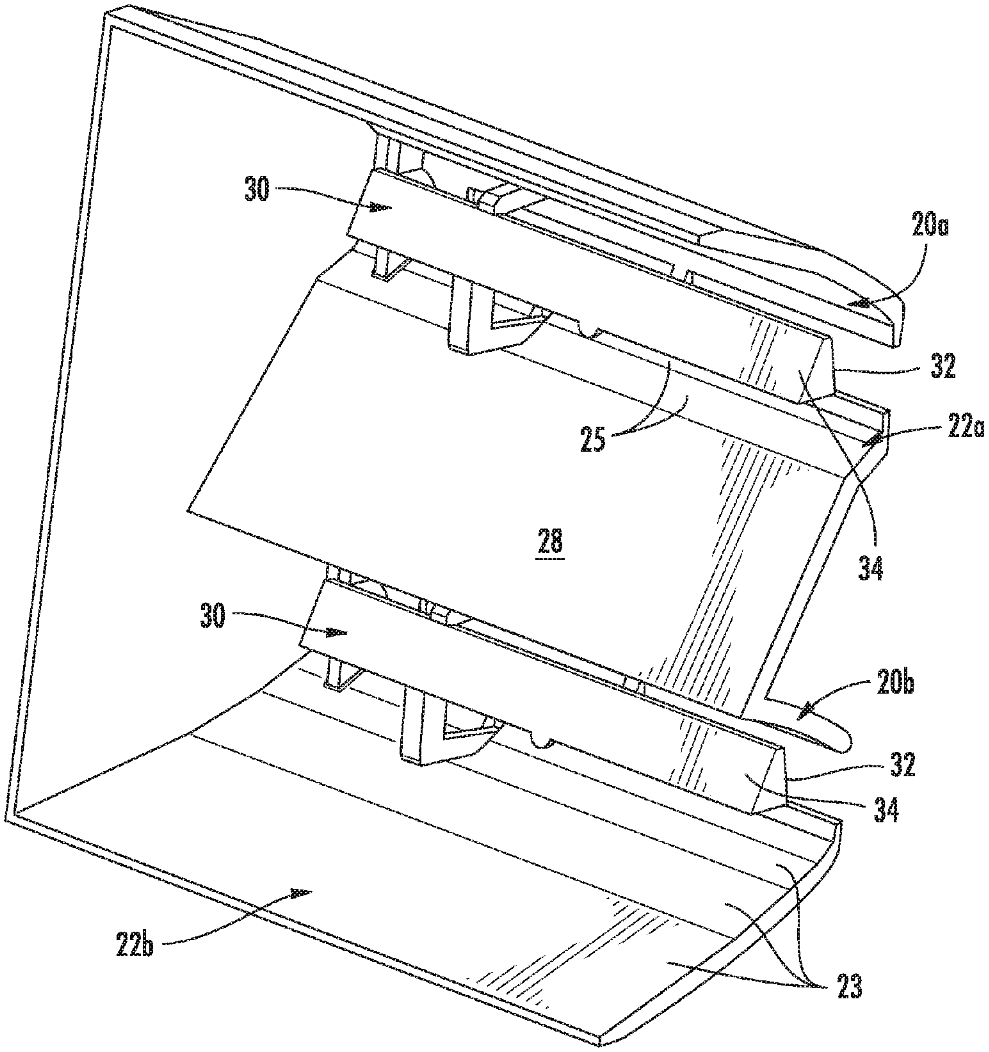
FIG. 5 is a partial sectional view, shown in perspective, of the reflector and lenses of the asymmetrical optical systems of the floodlight of FIG. 1.
Figure 6:
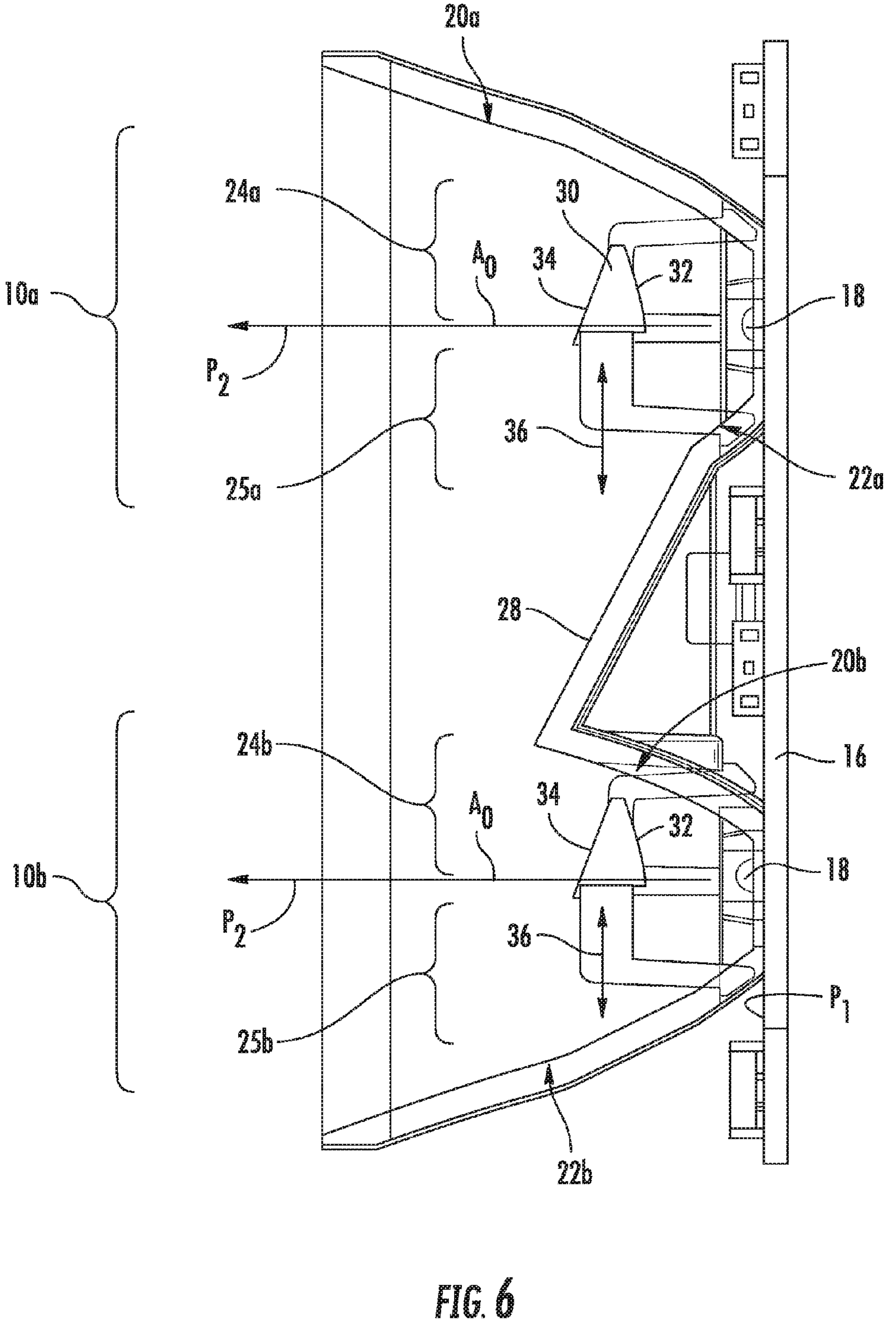
FIG. 6 is a side sectional view through the reflector, lenses and PC boards of the floodlight of FIG. 1.
Figure 7:
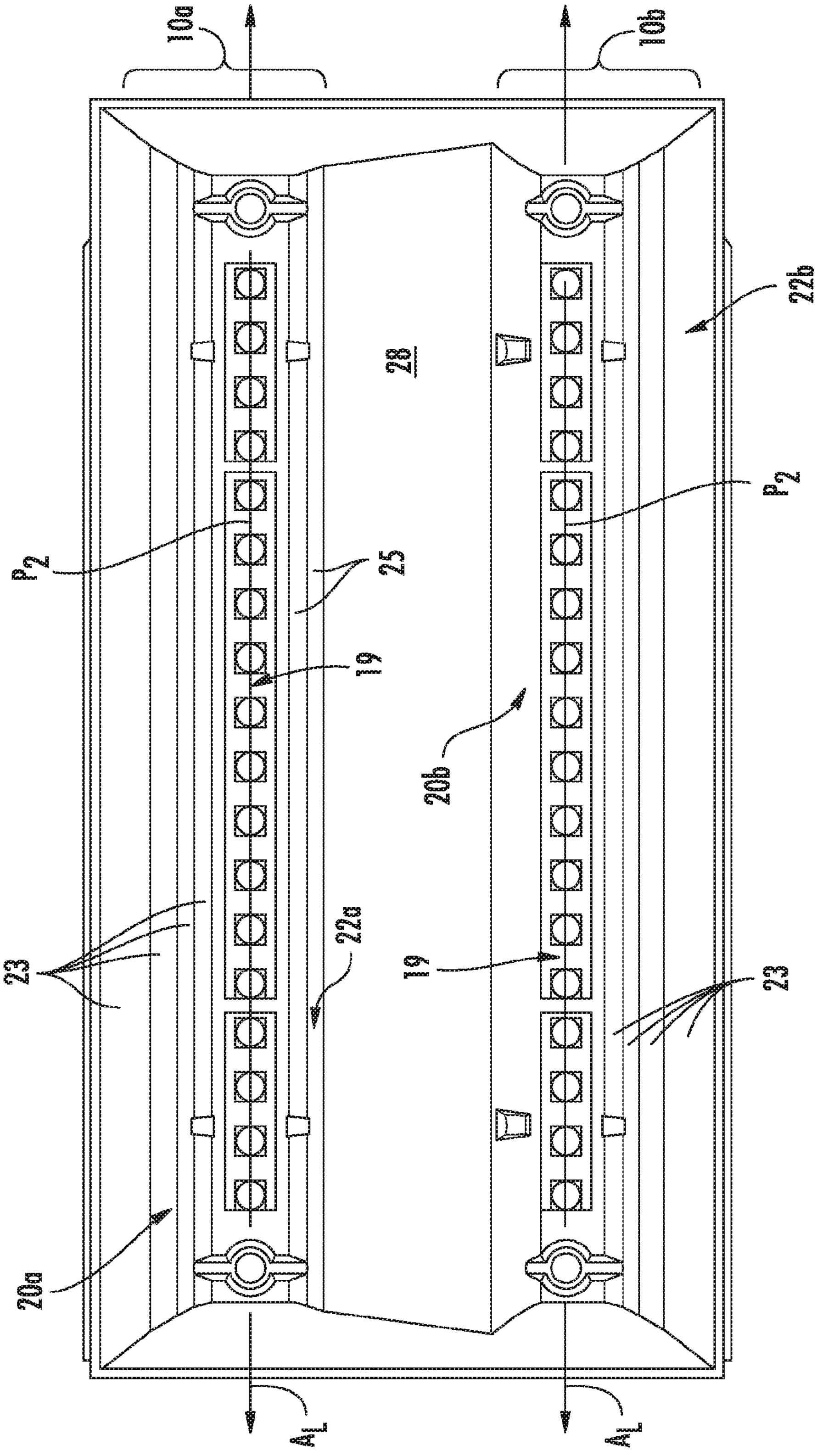
FIG. 7 is a front view of the reflector and PC boards of the floodlight of FIG. 1 with the lenses removed.
Figure 8:
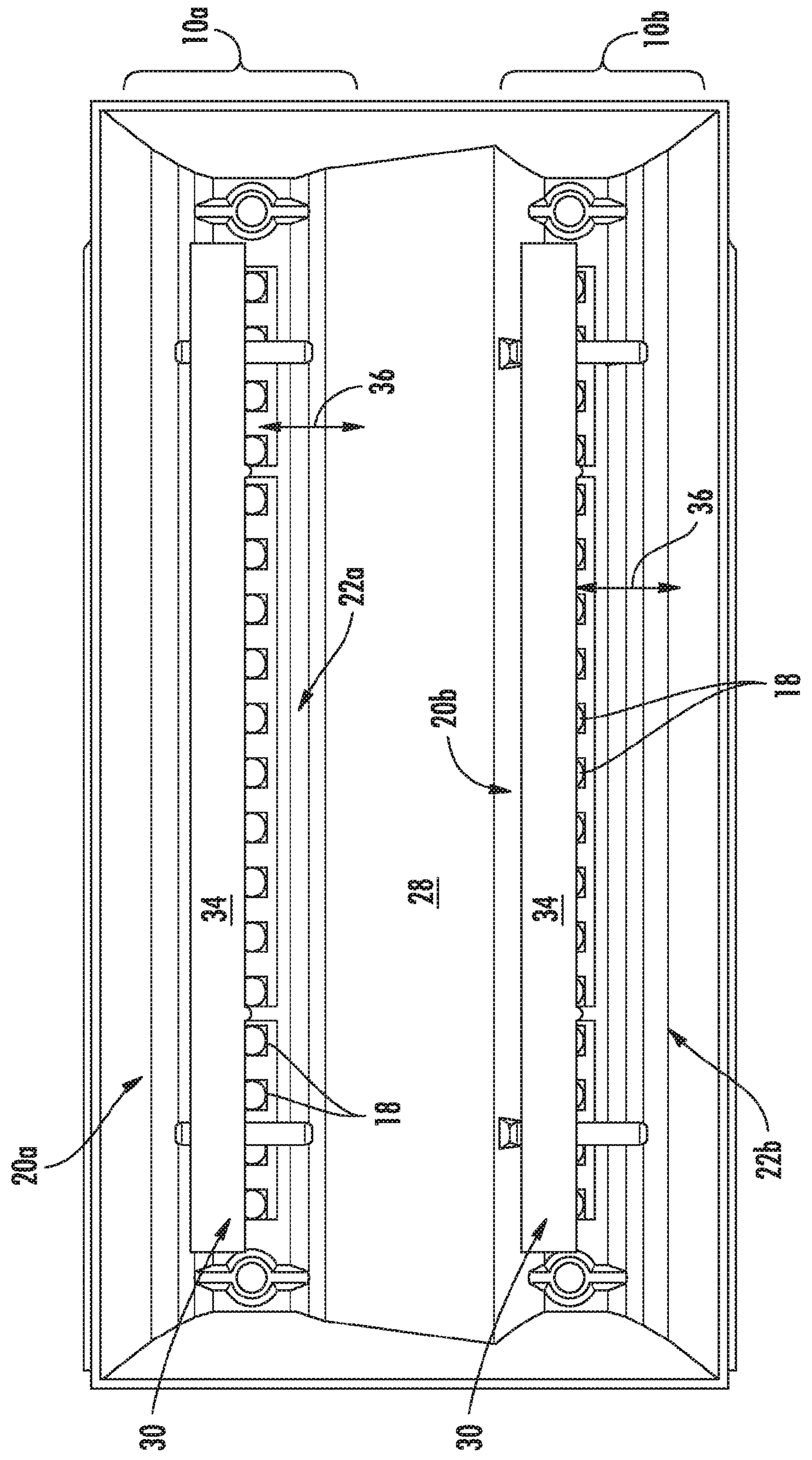
FIG. 8 is a front view of the reflector, PC boards and lenses of the floodlight of FIG. 1.

A collimated light emission pattern (such as a narrow beam) is not desirable for a floodlight and the disclosed asymmetrical optical systems 10*a*, 10*b* modify the optical elements to provide a divergent light emission pattern better suited to area illumination. For example, reflecting surfaces 20*a* and 22*b* in the disclosed floodlight 12 include longitudinally extending convex ribs 23 which serve to spread light with respect to the second plane $P_2$ as best shown in FIG. 2. The surface of each rib 23 begins and ends on the parabolic curve which generally defines the reflecting surface 20*a*, 22*b* and each rib 23 has a center of curvature outside of the parabolic curve. Thus, the several longitudinally extending ribs 23 (segments) closely track a curve defined by a parabolic equation to form a parabolic reflecting surface. As shown in FIGS. 2 and 4, the general effect of such a reflecting surface 20*a*, 22*b* is to redirect wide-angle light emitted from the LED over a range of emitted angles greater than approximately ~30°-~90° with respect to the second plane $P_2$ into a range of reflected angles (less than ~20°) with respect to said second plane $P_2$, where each angle in the range of reflected angles is less than any angle in the range of emitted angles. More specifically, the reflecting surfaces 20*a*, 22*b* are configured to produce a range of reflected angles with respect to the second plane $P_2$ that is less than ~20° to either side of the second plane $P_2$ or more preferably less than or equal to approximately 10° to either side of the second plane $P_2$. This configuration brings light into the desired light emission pattern for the floodlight and spreads the available light over a large area to produce an illumination pattern having relatively uniform brightness. This reflector configuration uses the reflecting surface to redirect light into the desired pattern, rather than collimating the light and then using a lens to spread the light.

Figure 3:
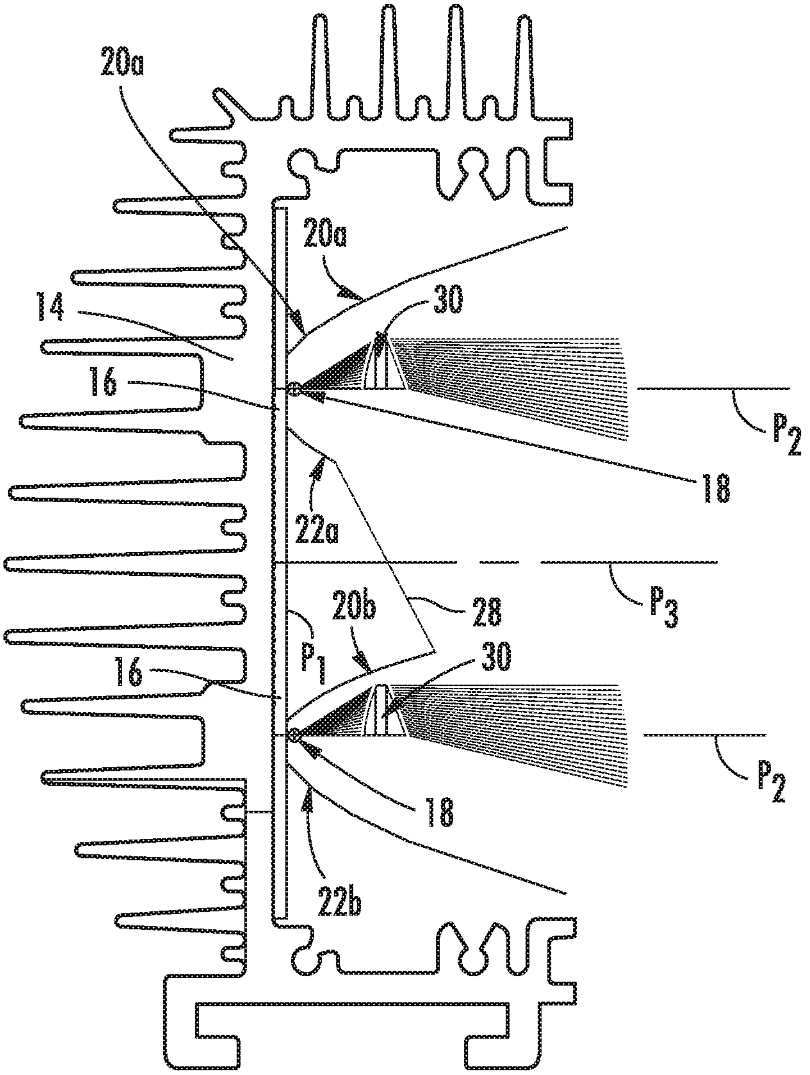
FIG. 3 is a sectional view through the floodlight of FIG. 1, showing redirection of light emanating from LED lamps by lenses in each of the disclosed asymmetrical optical systems.

Light is emitted from each LED lamp 18 in a divergent hemispherical pattern such that little or no light is emitted at an angular orientation that is convergent with the second plane $P_2$. As shown in FIGS. 2-4, the disclosed asymmetrical optical systems 10*a*, 10*b* redirect at least a portion of the divergent light emitted from each LED lamp 18 into an angular orientation that converges with and passes through the second plane $P_2$. For example, wide angle light emitted from LED lamps 18 in (upper) asymmetrical optical system 10*a* in an upward direction (according to the orientation of the Figures) at an angular orientation of greater than 30° with respect to the second plane is redirected by the corresponding reflecting surface 20*a* into a range of reflected angles, at least some of which give the light a direction (trajectory) which converges with and passes through the second plane $P_2$ to contribute to the illumination pattern below the second plane $P_2$ in the orientation shown in FIG. 2. The reverse is true of the opposite (lower) reflecting surface 22*b* of asymmetrical optical system 10*b*, which reorients wide-angle light from the LED lamps 18 into a direction that converges upwardly with and passes through the second plane $P_2$ to contribute to the illumination pattern above the second plane $P_2$ in the orientation of FIG. 2. Reflecting surfaces 20*a* and 22*b* are mirror images of each other in the disclosed asymmetrical optical systems, but this is not required.

Each asymmetrical optical system 10*a*, 10*b* also includes a lens optical element 30 arranged primarily to one side of the second plane $P_2$. As shown in FIGS. 1-6 and 8, the lens optical element 30 has a substantially constant sectional configuration and extends the length of the linear array 19 of LED lamps 18. The lens optical element 30 is primarily defined by a light entry surface 32 and a light emission surface 34. The light entry surface 32 and light emission surface 34 are constructed to cooperatively refract light incident upon the lens optical element 30 into a direction contributing to the desired illumination pattern for the floodlight as shown in FIGS. 3 and 4. In the case of the disclosed floodlight 12, the desired illumination pattern is a diverging pattern in which a majority of the optical energy of each linear array 19 of LED lamps 18 is emitted at an angular orientation below the second plane $P_2$ (with reference to the orientation of FIGS. 1-8). This illumination pattern is particularly useful in a flood or area light as it illuminates an area immediately beneath the light or adjacent the side of a vehicle equipped with the light, without requiring that the light be aimed in a dramatic downward orientation. In the disclosed lens optical element 30, the light entry surface 32 is an elongated curved surface convex in a direction facing the LED lamps 18. The light entry surface 32 is configured to at least partially collimate light entering the lens optical element, where "collimate" means redirect the light into an angular orientation substantially parallel with the second plane $P_2$. "Substantially collimated" as used herein means "close to parallel with" and should be interpreted to encompass angular orientations within about ±5° of parallel. As shown in FIG. 3, the light emission surface 34 of the disclosed lens optical element 30 is a planar surface having an orientation which refracts light leaving the lens optical element 30 into a range of angles from parallel (0°) with the second plane $P_2$ to angles converging with and passing through the second plane $P_2$. This lens optical element 30 configuration redirects light emitted on a trajectory divergent from and above the second plane $P_2$ of each asymmetrical optical system 10*a*, 10*b* to a direction contributing to the illumination pattern below the second plane $P_2$ of each asymmetrical optical system 10*a*, 10*b* according to the orientation shown in FIGS. 1-8.

The disclosed lens optical element 30 is asymmetrical with respect to the second plane $P_2$ and the optical axes $A_0$ of the LEDs 18. Specifically, the disclosed lens optical element 30 is positioned primarily to one side (above) of the second plane $P_2$, although other lens configurations and positions are compatible with the disclosed embodiments. The lens optical element 30 is closer to one of the reflecting surfaces 20*a*, 20*b* of the respective asymmetrical optical systems 10*a*, 10*b* than to the other of the reflecting surfaces 22*a*, 22*b*. The position of the lens optical element 30 defines a gap 36 between the lens optical element 30 and the lower reflecting surface 22*a*, 22*b* where light emitted from the LEDs 18 exits each asymmetrical optical system 10*a*, 10*b* without redirection by either the lens optical element 30 or either reflector. It will be noted that light from the LEDs 18 which is permitted to leave each asymmetrical optical system 10*a*, 10*b* without redirection has an emitted angular direction where the light contributes to the desired illumination pattern of the floodlight.

The reflecting surfaces 20*a*, 22*a*; 20*b*, 22*b* are not symmetrical with respect to each other as shown in FIGS. 1-8. In the upper asymmetrical optical system 10*a*, the top reflecting surface 20*a* projects away from the first plane $P_1$ a much greater distance than the truncated lower reflecting surface 22*a*. This configuration permits light from the LEDs 18 having an angular orientation of between 0° (parallel to $P_2$) and approximately 62° below the second plane $P_2$ to exit the upper asymmetrical optical system 10*a* without redirection by either the lens optical element 30 or either reflecting surface 20*a*, 22*a*. Reflecting surface 22*a* of the upper asymmetrical optical system 10*a* includes two longitudinally extending planar facets 25 where either longitudinal edge of each facet 25 touches on a parabolic curve. This configuration redirects wide-angle light (emitted at angles of between ~90°-~60° with respect to the second plane $P_2$) incident upon the lower reflecting surface 22*a* into a range of reflected angles from about 10° divergent from said second plane to about 10° convergent with respect to the second plane as best seen in FIG. 2.

To complete the reflector of the disclosed floodlight 12, a planar surface 28 connects the outer edge of the upper asymmetrical optical system 10*a* lower reflecting surface 22*a* with the outer edge of the lower asymmetrical optical system 10*b* upper reflecting surface 20*b*. Surface 28 is aluminized to reflect light incident upon it, but this surface does not form an operational component of either asymmetrical optical system 10*a*, 10*b*.

It will be observed that the upper and lower asymmetrical optical systems 10*a*, 10*b* differ with respect to each other. The upper asymmetrical optical system 10*a* employs a truncated lower reflecting surface 22*a* comprised of planar longitudinally extending facets 25. The facets begin and end on a parabolic curve and form a parabolic reflecting surface 22*a*. The lower asymmetrical optical system 10*b* employs a lower reflecting surface 22*b* that is a mirror image of the upper asymmetrical optical system 10*a* upper reflecting surface 20*a*.

The lower asymmetrical optical system 10*b* upper reflecting surface 20*b* is a parabolic surface defined by projection of a parabolic curve along the longitudinal axis $A_L$ passing through the LED dies of the lower asymmetrical optical system 10*b* linear array 19 of LED lamps 18. The parabolic curve used to define reflecting surface 20*b* has a shorter focal length than the curves employed to define the other reflecting surfaces 20*a*, 22*a*, 22*b* (measured between the focus and the vertex of the parabolic curve). The focal length of the curve used for reflecting surface 20*b* is approximately one-half of the focal length (0.05" vs. 0.1") of the curve used to define the other reflecting surfaces 20*a*, 22*a*, 22*b*. This surface construction redirects light emitted from the lower linear array 19 of LED lamps 18 in asymmetrical optical system 10*b* above the second plane $P_2$ and divergent from the second plane $P_2$ into a direction substantially collimated with respect to the second plane as shown in FIG. 4. As shown in FIG. 4, some light redirected by reflecting surfaces 20*a* and 20*b* is collimated (substantially parallel with plane $P_2$) and passes through lens optical elements 30. The lens optical element 30 redirects this collimated light into an orientation which converges with and passes (downwardly) through the second plane $P_2$. This light contributes to the desired illumination pattern of the flood light 12.

Each asymmetrical optical system 10*a*, 10*b* is asymmetrical with respect to a second plane $P_2$ which includes the optical axes $A_0$ of the LED lamps 18 in the respective linear arrays 19 of LED lamps. The illumination pattern generated by the flood light 12 is asymmetrical with respect to a third plane $P_3$ bisecting the flood light 12.

The disclosed optical systems employing a reflector and lens optical elements may alternatively be constructed employing internal reflecting surfaces of a longitudinally extending solid of optically transmissive material as is known in the art.

While the invention has been described in terms of disclosed embodiments, those skilled in the art will recognize that the invention can be practiced with modifications within the spirit and the scope of the appended claims.

What is claimed:

1. A light assembly having an illumination pattern, said light assembly comprising:

an LED light source comprising a light emitting die and having an optical axis extending from said light emitting die and perpendicular to a first plane, said LED emitting light within a hemisphere centered on said optical axis, said hemisphere bisected by a second plane including said optical axis and perpendicular to said first plane;

a reflecting surface spaced from said second plane in a first direction, said reflecting surface arranged to redirect light from a range of emitted angles at which said light is emitted from said LED light source into a range of reflected angles with respect to said second plane, said range of reflected angles including angles defining a first trajectory of light emission convergent with and passing through said second plane in a second direction opposite the first direction; and an optical element in the path of light emitted from said LED light source, said optical element comprising light entry and light emission surfaces configured to refract at least a portion of light emitted from said LED light source passing through said optical element into a range of refracted angles with respect to said second plane, said range of refracted angles including angles defining a second trajectory of light emission convergent with and passing through said second plane in the second direction;

wherein said optical element is asymmetrical with respect to said second plane.

2. The light assembly of claim 1, wherein said LED light source comprises a plurality of LED light sources arranged along a longitudinal axis perpendicular to the optical axes of the LED light sources, said optical axes being included in said second plane.

3. The light assembly of claim 1, wherein said reflecting surface is a parabolic surface having a focal point and said light emitting die is positioned at said focal point.

4. The light assembly of claim 2, wherein said reflecting surface is defined by projecting a parabolic curve along said longitudinal axis.

5. The light assembly of claim 1, wherein said reflecting surface is a parabolic surface defined by a parabolic equation.

6. The light assembly of claim 1, wherein said reflecting surface projects in a direction of light emission to an outer edge, the outer edge of said reflecting surface extending past said optical element in the direction of light emission.

7. The light assembly of claim 6, wherein said reflecting surface projects in the direction of light emission to an outer edge and said optical element is positioned adjacent said second plane and intermediate said first plane and the outer edge of said reflecting surface in the direction of light emission.

8. A light assembly comprising:

a plurality of LED light sources, each LED light source comprising a light emitting die and having an optical axis extending from said light emitting die and perpendicular to a first plane and emitting light within a hemisphere centered on said optical axis, said hemisphere bisected by a second plane including said optical axes and perpendicular to said first plane, said LED light sources arranged along a longitudinal axis perpendicular to the optical axes of the LED light sources, said optical axes being included in said second plane;

a reflecting surface spaced apart from said second plane in a first direction, said reflecting surface arranged to redirect light from a range of emitted angles at which said light is emitted from said LED light sources into a range of reflected angles with respect to said second plane, said range of reflected angles including angles defining a first trajectory of light emission convergent with and passing through said second plane in a second direction opposite said first direction;

a longitudinally extending optical element in the path of light emitted from said LED light sources, said optical element comprising light entry and light emission surfaces configured to refract at least a portion of light from said LED light source passing through said optical element into a range of refracted angles with respect to said second plane, said range of refracted angles including angles defining a second trajectory of light emission convergent with and passing through said second plane in the second direction, wherein said optical element is asymmetrical with respect to said second plane.

9. The light assembly of claim 8, wherein at least one of said light entry or light emission surfaces is a planar surface.

10. The light assembly of claim 8, wherein said reflecting surface is a parabolic surface having a focal point and said light emitting dies are positioned at said focal point.

11. The light assembly of claim 8, wherein said reflecting surface is defined by projecting a parabolic curve along said longitudinal axis.

12. The light assembly of claim 8, wherein said reflecting surface projects in a direction of light emission to an outer edge disposed at a distance from said first plane beyond the position of said optical element.

13. The light assembly of claim 8, wherein said optical element is parallel to said longitudinal axis, positioned adjacent said second plane and a major portion of said optical element is intermediate said second plane and said reflecting surface.

14. The light assembly of claim 12, wherein said reflecting surface projects in the direction of light emission to an outer edge and said optical element is positioned adjacent said second plane and intermediate said first plane and the outer edge of said reflecting surface in the direction of light emission.

15. The light assembly of claim 1, wherein each angle with respect to said second plane in said range of reflected angles is less than any angle with respect to said second plane in said range of emitted angles for light incident on said reflecting surface.

16. The light assembly of claim 1, wherein a majority of said optical element is located between said reflecting surface and said second plane.

17. The light assembly of claim 1, further comprising a second reflecting surface spaced from said second plane in the second direction, said second reflecting surface redirecting a portion of light emitted from said LED light source into a second range of reflected angles with respect to said second plane.

18. The light assembly of claim 17, wherein said second range of reflected angles defines a third trajectory of light emission convergent with and passing through said second plane in the first direction.

* * * * *